United States Patent [19]
Potter et al.

[11] 3,878,453
[45] Apr. 15, 1975

[54] PIPELINE SIGNALLING SYSTEMS AND TECHNIQUES

[75] Inventors: David W. Potter, West Hill, Ontario; Frederick V. Topping, Downsview, Ontario, both of Canada

[73] Assignee: Trans Canada Pipelines Limited, Toronto, Ontario, Canada

[22] Filed: Sept. 21, 1973

[21] Appl. No.: 399,473

[52] U.S. Cl. ............... 324/3; 324/37; 324/67
[51] Int. Cl. ................................. G01r 19/16
[58] Field of Search ........... 324/3, 67, 37, 34; 73/40.5

[56] References Cited
UNITED STATES PATENTS

| | | | |
|---|---|---|---|
| 2,092,951 | 9/1937 | Blake | 324/67 |
| 2,573,799 | 11/1951 | MacLean | 324/37 |
| 2,601,248 | 6/1952 | Brenholot | 324/67 |
| 2,820,959 | 1/1958 | Bell | 324/67 UX |
| 2,940,302 | 6/1960 | Scherbatskoy | 73/40.5 |
| 3,064,127 | 11/1962 | Green et al. | 324/37 UX |
| 3,418,572 | 12/1968 | Humphreys | 324/67 |
| 3,754,275 | 8/1973 | Carter et al. | 324/67 X |

*Primary Examiner*—Gerard R. Strecker

[57] ABSTRACT

An AC coil is located externally of a pipeline with the pipeline passing other than through the core of the coil and with at least a part of the imaginary surface created by projecting the coil parallel to its longitudinal axis intersecting the pipeline. Alternating current is supplied to the coil. The resultant magnetic flux induces eddy currents to flow in the pipeline. A flux detector located within the pipeline detects the magnetic flux generated by the eddy currents. The flux detector may be carried by a pipeline pig and the detected signal used to locate the pig in the pipeline or control some function of the pig.

19 Claims, 3 Drawing Figures

PIPELINE SIGNALLING SYSTEMS AND TECHNIQUES

BACKGROUND OF THE INVENTION

This invention relates to systems and techniques for generating a signal externally of a pipeline and detecting within the pipeline a signal indicative of the presence of the externally generated signal.

It is common practise in natural gas transmission pipelines, for example, from time to time to pass a pipeline pig through the pipeline to inspect the same for the purpose of locating cracks or other structural defects. In general, the pig is inserted into the pipeline and moved therethrough. Means associated with the pig establish a magnetic field in the pipeline. A flaw, such as a crack or the like in the pipeline, creates an anomaly which is detected by magnetic flux sensing coils associated with the pig. The detected signal is recorded on a magnetic tape, for example. After processing of the tape and interpretation of the signals recorded thereon, the flaw can be located and repaired.

It is essential, of course, that some system be provided to correlate a flaw signal on the tape with the location of the flaw in the pipeline. One system that has been used for this purpose is an odometer wheel associated with the pig that provides a signal which indicates the distance that the pig has travelled, this signal being recorded along with the signal from the sensing coils. Such a system is subject to inaccuracies arising from slippage or jamming of the odometer wheel.

Another system involves the counting and recording of pipe joints. This system requires that the number and exact location of each joint in the portion of the pipeline being inspected be known.

Yet another system involves the placement of permanent magnets on the portion of the pipeline being inspected. This requires the pipeline to be exposed at various locations, and hence is a relatively expensive procedure. The other disadvantages of this system are that permanent magnets produce relatively small signals that are difficult to distinguish from noise and other signals recorded on the tape, may leave magnetic areas on the pipe that will give false readings and may damage magnetic tape if located nearby.

It also may be desirable to control some function of a pipeline pig when it reaches a specific location in a pipeline. In U.S. Pat. No. 3,495,626, D. D. Nagel issued Feb. 17, 1970 systems are disclosed for causing a pig to block a pipeline when it reaches a predetermined location, so that a portion of the pipeline ahead of the pig can be repaired. In one embodiment disclosed by Nagel an AC coil is wrapped around the pipeline and energized from an AC source. This causes eddy currents to flow around the pipeline. The magnetic flux generated by the eddy currents is detected by a sensing coil carried by the pig. The detected signal is applied to a control system which stops the pig and plugs the pipeline. The primary disadvantage of this system is that the pipeline must be exposed in order to wrap the AC coil around it. Moreover, the signal detected by the sensing coil in such a system gradually increases in amplitude to a poorly defined maximum adjacent the centre of the AC coil and then gradually decreases in amplitude. Such a signal is not the best waveform for precise locating purposes if it is used in conjunction with a flaw detection system.

In another embodiment, which also requires exposure of the pipeline, Nagel discloses the placement of an electromagnet on the pipeline. In this embodiment leakage flux from the electromagnet is detected. Because the pipeline acts as an electromagnet shield, it is important that the electromagnet be placed on or very close to the pipeline so that a detectable amount of leakage flux is present within the pipeline. This embodiment also may result in magnetic areas being left on the pipeline.

SUMMARY OF THE INVENTION

In accordance with this invention a pipeline signalling system and technique has been developed which obviates the disadvantages of the prior art systems referred to hereinbefore. A particularly important feature of the invention is that it does not require the exposure of the pipeline, although the pipeline may be exposed if desired. Thus, in accordance with the invention, an AC coil is located externally of a pipeline with the pipeline passing other than through the core of the coil and with at least a part of the "shadow" of the coil falling on the pipeline. Alternating current is supplied to the coil. The magnetic flux generated thereby induces eddy currents in the pipeline. Flux detecting means located within the pipeline detect the magnetic flux generated by the eddy currents, the detected signal then being used for locating, controlling or other purposes as desired.

BRIEF DESCRIPTION OF THE DRAWINGS

This invention will become more apparent from the following detailed description, taken in conjunction with the appended drawings, in which:

Referring to FIG. 1, buried in the ground 10 is a pipeline 11 that may be a natural gas transmission pipeline, for example. Located on the surface 12 of ground 10 directly above pipeline 11 is an AC coil 13. Coil 13 preferably is of about the same diameter as the diameter of pipeline 11. Although this is not critical, having the coil and pipeline of about the same diameter results in a readily identifiable and detectable signal within the pipeline. Assuming the pipeline to be horizontal, the plane of coil 13 preferably is horizontal as well. Coil 13 is connected via conductors 14 to a suitable AC source 15. Coil 13 may be located up to several diameters distant from pipeline 11. It should be noted, however, that the spacing between coil 13 and pipeline 11 can vary to some extent depending upon the strength of the AC current that is passed through coil 13, greater spacings being permitted with larger currents. In the preferred embodiment the longitudinal axis of coil 13 intersects pipeline 11. Preferably the longitudinal axis of coil 13 intersects the longitudinal axis of pipeline 11 at right angles.

Positioned within pipeline 11 and movable therethrough, e.g., by virtue of being mounted on a pipeline pig, is a detector coil 16. Detector coil 16 preferably is mounted at right angles to AC coil 13, and hence with its longitudinal axis parallel to the longitudinal axis of pipeline 11, and preferably is of relatively large diameter, somewhat less than the internal diameter of pipeline 11. It is to be understood, however, that detecting devices other than a coil may be employed without departing from this invention. For example, Hall effect devices may be used.

Figure 3:
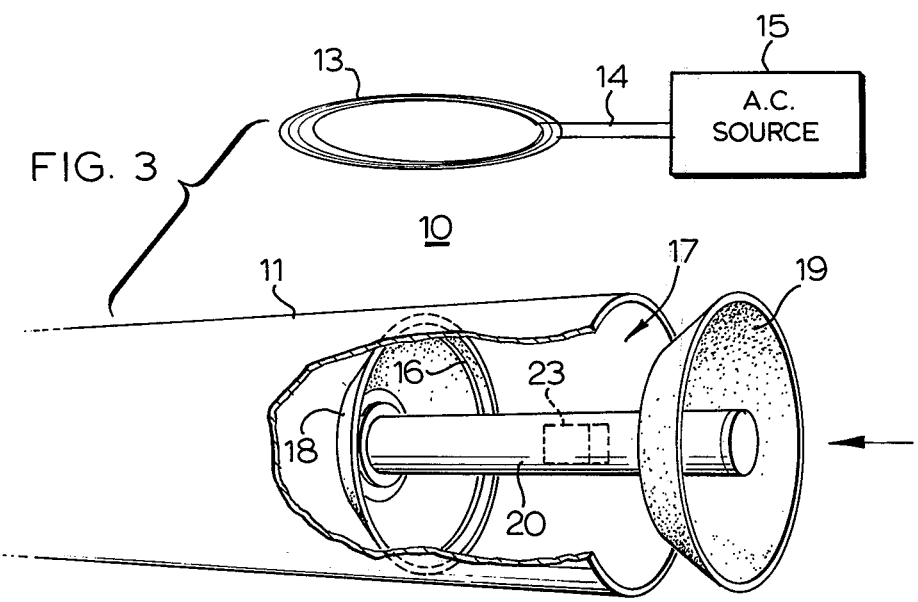
FIG. 3 is a perspective view of another pipeline signalling system embodying this invention and also shows a pipeline pig.

Referring now to FIG. 3, a pipeline pig 17 that moves through pipeline 11 in the direction indicated by the arrow is shown. Pig 17 includes conventional, so-called scraper cups 18 and 19 and a housing 20 mounted and extending therebetween, the latter having housed therein suitable electronic equipment including a tape recorder 23. Pig 17 may be an instrument pig, in which event it will carry suitable sensor shoes as outlined in greater detail in copending Patent Application Ser. No. 334,127 filed Feb. 20, 1973 and entitled "Speed Compensation of Information-Containing Signals." These sensor shoes have not been shown in FIG. 3 because they constitute no part of the instant invention. On the other hand, pig 17 may be a pipeline blocking or plugging pig of the type disclosed in the aforementioned Nagel patent or some other type of pipeline pig. As shown in FIG. 3, detector coil 16 is mounted on scraper cup 18. In this embodiment of the invention AC coil 13 may be mounted directly on the pipeline and, to this end, may be generally saddle-shaped in configuration. If so mounted, the pipeline would have to be exposed. In both embodiments, however, a preformed AC coil can be used, rather than one which must be wrapped around the pipeline in situ.

Figure 1:
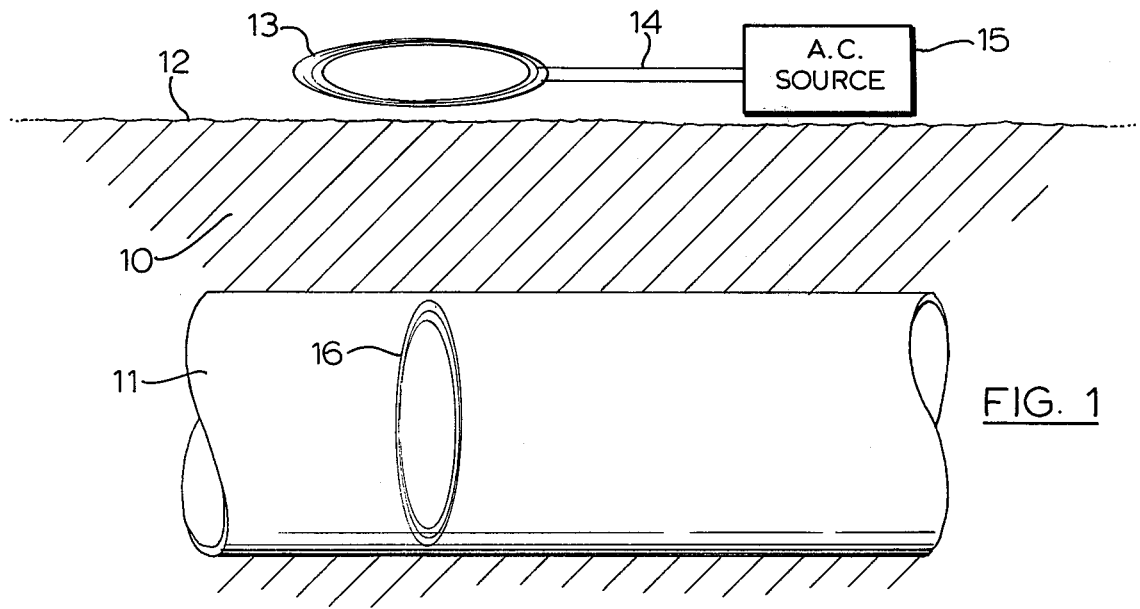
FIG. 1 is a perspective view which schematically illustrates a pipeline signalling system embodying this invention.
Figure 2:
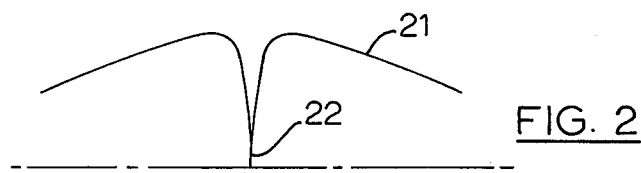
FIG. 2 illustrates the variation in the amplitude of the signal detected by a pipeline signalling system embodying this invention as the pig passes the AC coil.

In operation, coil 13 is positioned at any desired location along the length of the pipeline and alternating current is supplied thereto from AC source 15. Coil 13 generates magnetic flux which induces eddy currents to flow in pipeline 11, these currents flowing in a generally circular path. The eddy currents themselves generate magnetic flux which is detected by coil 16 as it passes through the section of pipeline 11 in which the eddy currents are flowing. The variation in the amplitude of the signal 21 detected by coil 16 as it moves past AC coil 13 is shown in FIG. 2. At the centre of the eddy current "ring" cancellation takes place resulting in the null indicated at 22. There also is a phase reversal of the detected signal on opposite sides of the null point resulting in a readily identifiable signal. This signal may be amplified and recorded for purposes of pig location or it may be used as a control signal to control some function of the pipeline pig, as in the aforesaid Nagel patent.

Typical results with a 200 turn, 34 inches diameter detector coil inside a 0.33 inch thick 36 inch pipe are a signal output from detector coil 16 of 6 millivolts peak to peak when an external ten turn, 36 inches diameter AC coil 13 located 4½ feet from the pipe and excited with about 23 amps of 60 cycle current is employed.

While, for the sake of convenience, 60 Hz was chosen as the operating frequency in the aforementioned example, this frequency is not critical. However, coupling efficiency may decrease with increasing frequency.

Also, while, in the preferred embodiment of the invention, coil 13 is mounted with its longitudinal axis intersecting the longitudinal axis of the pipeline at right angles, this is not essential. What is required, however, is that at least a part of the imaginary surface that is created by projecting the AC coil parallel to its longitudinal axis intersect the pipeline. Naturally the form of the detected signal will vary dependent upon how much of this "surface" cuts the pipeline.

While preferred embodiments of the invention have been described herein, those skilled in the art will appreciate that changes and modifications may be made therein without departing from the spirit and scope of the invention as defined in the appended claims.

What we claim as our invention is:

1. Apparatus for generating a signal externally of an electrically conductive pipeline and detecting within the pipeline a signal indicative of the presence of the externally generated signal comprising an AC coil having a core and a longitudinal axis, said coil being located externally of said pipeline with said pipeline passing other than through the core of said coil and with at least a part of the imaginary surface created by projecting said AC coil parallel to said longitudinal axis thereof intersecting said pipeline, means for supplying alternating current to said coil to thereby generate magnetic flux and induce eddy currents to flow in said pipeline and flux detecting means located within said pipeline for detecting magnetic flux generated by said eddy currents.

2. Apparatus according to claim 1 wherein the diameter of said coil is not greater than the diameter of said pipeline and at least substantially all of said imaginary surface intersects said pipeline.

3. Apparatus according to claim 2 wherein said longitudinal axis of said coil is substantially perpendicular to the longitudinal axis of said pipeline.

4. Apparatus according to claim 3 wherein said coil is essentially flat.

5. Apparatus according to claim 1 wherein said pipeline is buried in the ground and said coil is located on the ground above said pipeline.

6. Apparatus according to claim 3 wherein said coil is essentially saddle-shaped.

7. Apparatus according to claim 6 wherein said coil is seated on said pipeline.

8. Apparatus according to claim 1 wherein said flux detecting means comprises a sensing coil.

9. Apparatus according to claim 8 wherein said sensing coil has a longitudinal axis that is substantially parallel to the longitudinal axis of said pipeline.

10. Apparatus according to claim 9 wherein the diameter of said sensing coil is slightly less than the internal diameter of said pipeline.

11. Apparatus according to claim 1 wherein said flux detecting means comprises at least one Hall effect device.

12. Apparatus according to claim 1 including a pipeline pig, said flux detecting means being carried by said pipeline pig for passage through said pipeline.

13. Apparatus according to claim 12 including means carried by said pipeline pig for recording signals detected by said flux detecting means.

14. Apparatus according to claim 13 wherein said sensing coil has a longitudinal axis that is substantially parallel to the longitudinal axis of said pipeline and wherein the diameter of said sensing coil is slightly less than the internal diameter of said pipeline.

15. Apparatus according to claim 14 wherein said pipeline is buried in the ground, said AC coil is located on the ground above said pipeline, said longitudinal axis of said AC coil is substantially perpendicular to the longitudinal axis of said pipeline, the diameter of said AC coil is not greater than the diameter of said pipeline, and at least substantially all of said imaginary surface intersects said pipeline.

16. A method for transmitting a signal to a pig located in an electrically conductive pipeline which comprises providing an AC coil having a core and a longitudinal axis, said coil being located externally of said pipeline with said pipeline passing other than through the core of said coil and with at least a part of the imaginary surface created by projecting said AC coil parallel to said longitudinal axis thereof intersecting said pipeline, energizing said coil with alternating current to generate magnetic flux and induce eddy currents to flow in said pipeline, and passing flux detecting means carried by said pig through the magnetic flux generated by said eddy currents and thereby detecting the presence of the last-mentioned magnetic flux.

17. A method according to claim 16 including the step of generating a signal responsive to the detection of said last-mentioned magnetic flux and recording said signal.

18. A method according to claim 16 including the step of generating a signal responsive to the detection of said last-mentioned magnetic flux and using said signal to initiate a functional operation of said pig.

19. A method according to claim 16 wherein the diameter of said coil is not greater than the diameter of said pipeline and at least substantially all of said imaginary surface intersects said pipeline, said flux detecting means is a sensing coil having a longitudinal axis, and said sensing coil is passed through said last-mentioned magnetic flux with the longitudinal axis of said sensing coil substantially parallel to the longitudinal axis of said pipeline.

* * * * *